United States
Kotani 4,068,924

Jan. 17, 197

[54] LIGHT COLLECTOR MEANS FOR IRRADIATING A LIQUID CRYSTAL DISPLAY DEVICE

[75] Inventor: Yasuhiro Kotani, Yamatokoriyama, Japan

[73] Assignee: Sharp Kabushiki Kaisha, Osaka, Japan

[21] Appl. No.: 663,459

[22] Filed: Mar. 3, 1976

[30] Foreign Application Priority Data

Mar. 4, 1975 Japan ............................ 50-26633
May 21, 1975 Japan ............................ 50-68878
Sept. 23, 1975 Japan ............................ 50-130588

[51] Int. Cl.² ............................................ G02F 1/13
[52] U.S. Cl. ............................ 350/160 LC; 235/1 D; 350/190; 362/335
[58] Field of Search ................... 350/160 LC, 190; 235/1 D; 240/2.1

[56] References Cited
U.S. PATENT DOCUMENTS

| | | |
|---|---|---|
| 3,881,807 | 5/1975 | Hosokawa et al. ........... 350/160 L |
| 3,957,351 | 5/1976 | Stockwell ..................... 350/160 L |
| 3,966,303 | 6/1976 | Yamamoto .................... 350/160 L |
| 3,984,176 | 10/1976 | Hirai et al. ................... 350/160 L |
| 3,986,014 | 10/1976 | Katsui et al. ................. 350/160 LC |

*Primary Examiner*—Edward S. Bauer
*Attorney, Agent, or Firm*—Birch, Stewart, Kolasch & Birch

[57] ABSTRACT

A light collector means such as a focusing lens is provided adjacent to a liquid crystal display device for irradiating the liquid crystal display device. In an electronic apparatus such as an electronic calculator or an electronic timepiece including a tiltable, shielding hood structure slidably mounted on the housing of the electronic apparatus above the liquid crystal display device, the light collector means is preferably positioned at the end of the hood structure.

14 Claims, 16 Drawing Figures

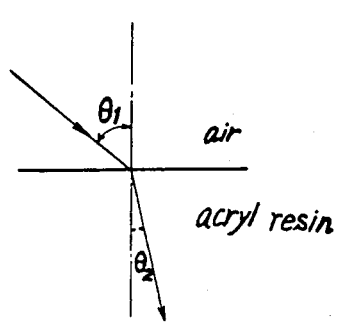
Fig.4
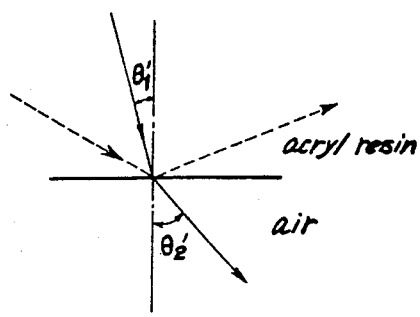
Fig.5
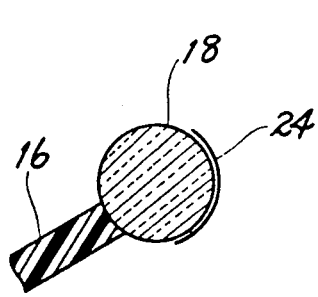
Fig.6
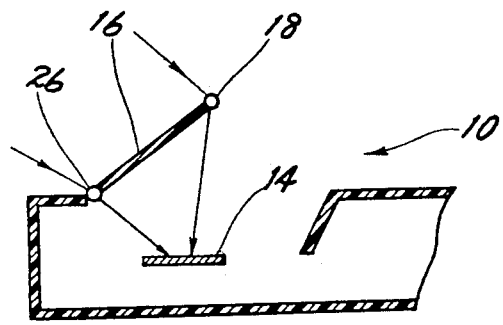
Fig.7
Fig.9
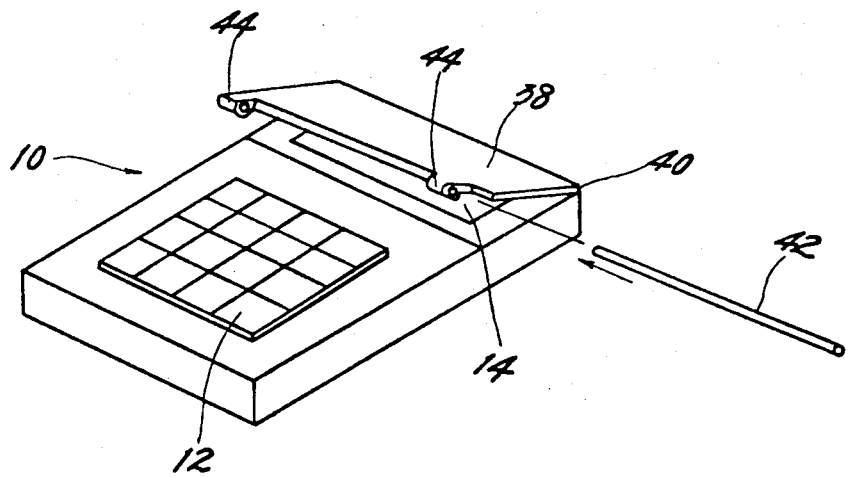

LIGHT COLLECTOR MEANS FOR IRRADIATING A LIQUID CRYSTAL DISPLAY DEVICE

BACKGROUND OF THE INVENTION

The present invention relates to a housing of an electronic apparatus including a liquid crystal display device and, more particularly, to a light collector means for irradiating the liquid crystal display device.

Generally, in an electronic apparatus such as an electronic calculator or an electronic timepiece including a liquid crystal display device, a shielding hood structure is mounted on the housing of the electronic apparatus above the liquid crystal display device to enhance the display quality.

Such a hood structure is very effective for a dynamic scattering mode liquid crystal display device of the reflection type in which a reflection electrode has a mirror surface. When the shielding hood structure is not provided, light beams striking the surface window or the reflection electrode of the liquid crystal display device will reflect directly into the operator's eyes. Thus reflected light beams form images of environment surrounding the electronic apparatus, which will damage visibility of the liquid crystal display device.

Therefore, the shielding hood structure is unavoidable for the liquid crystal display device, especially for the dynamic scattering mode liquid crystal display device of the reflection type. However, the light amount, or the light intensity irradiating the liquid crystal display device is unavoidably reduced by providing the above-mentioned shielding hood structure.

The light intensity irradiating the liquid crystal display device greatly influences the visibility and, especially, the indication contrast of the liquid crystal display device.

OBJECTS AND SUMMARY OF THE INVENTION

Accordingly, an object of the present invention is to enhance the visibility of a liquid crystal display device employed in an electronic apparatus such as an electronic calculator or an electronic timepiece.

Another object of the present invention is to provide a novel housing of an electronic apparatus including a liquid crystal display device suited for enhancing the display quality.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to an embodiment of the present invention, a light collector means such as a focusing lens is provided adjacent to a liquid crystal display device for irradiating the liquid crystal display device. In an electronic apparatus such as an electronic calculator or an electronic timepiece including a tiltable, shielding hood structure slidably mounted on the housing of the electronic apparatus above the liquid crystal display device, the light collector means is preferably positioned at the end of the hood structure.

The light collector means is, in a preferred form, a transparent or translucent round bar fixed to the end of the hood structure. Light beams from the back of the hood structure are refracted at the round bar and introduced into the liquid crystal display device in addition to the light beams from the operator's side.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIGS. 4 and 5 are schematic drawings for the purpose of explaining optical paths of incident light beams to the light collector means of the present invention;

FIG. 6 is a sectional view of another embodiment of the light collector means of the present invention;

FIG. 7 is a sectional view showing part of an electronic calculator employing still another embodiemnt of the light collector means of the present invention;

FIG. 9 is a schematic perspective view of an electronic calculator including an embodiment of a hood structure of the present invention;

DESCRIPTION OF THE PREFERRED EMBODIMENTS

Figure 1:
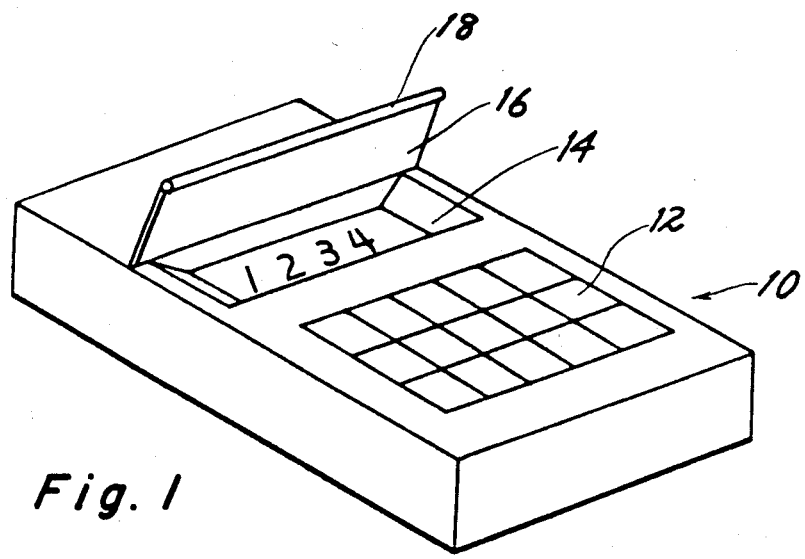
FIG. 1 is a schematic perspective view of an electronic calculator including an embodiment of a light collector means of the present invention.

Referring now to FIG. 1, there is illustrated an electronic calculator 10 including a keyboard unit 12, a liquid crystal display device 14, and a tiltable, shielding hood structure 16 mounted on the housing of the electronic calculator 10 above the liquid crystal display device 14.

Figure 2:
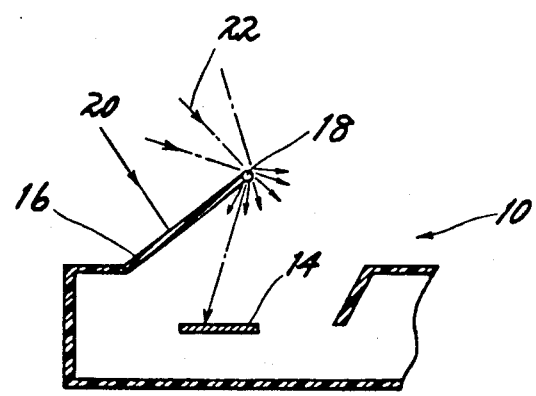
FIG. 2 is a sectional view showing an indication section of the electronic calculator of FIG. 1.
Figure 3:
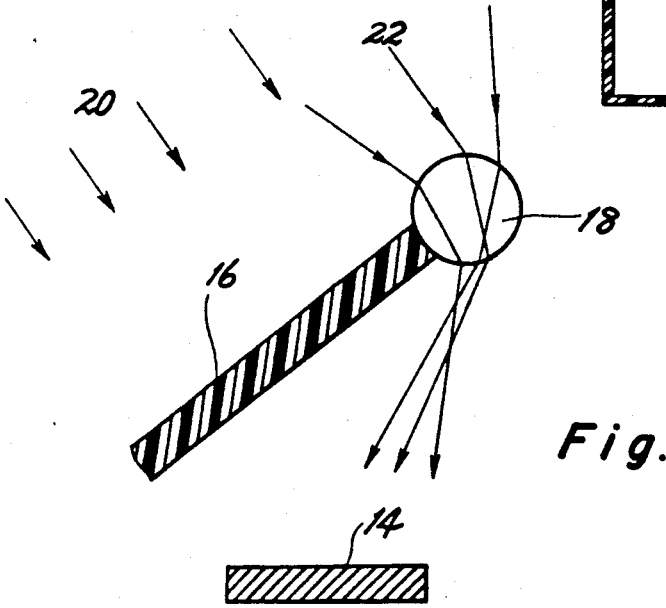
FIG. 3 is a partially enlarged sectional view showing the light collecting operation of the light collector means of the present invention.

A transparent round bar 18 made of, for example, acrylic resin is fixed to the end of the tiltable, shielding hood structure 16. Light beams 20 impinging on the tiltable, shielding hood structure 16 is interrupted by the hood structure 16 and, therefore, they do not strike the liquid crystal display device 14 and, hence, they do not reflect directly into the operator's eyes as shown in FIG. 2. Light beams 22 introduced into the transparent round bar 18 are refracted at the transparent round bar 18 and conducted to the liquid crystal display device 14 to irradiate it. The refraction mode of the light beams 22 will be clearly understood by FIG. 3. As shown in FIG. 3, a part of the light beams 22 introduced into the transparent round bar 18 is conducted to the liquid crystal display device 14. Therefore, the liquid crystal display devvice 14 receives not only light beams from the operator's side but also thus refracted light beams, whereby the visibility, or, the display contrast is enhanced.

FIGS. 4 and 5 show optical paths of the light beams passing the boundary area between the air and the acrylic resin.

The incident light from the air to the acrylic resin is refracted in such a manner to satisfy the following relation.

$$\sin \theta_1 / \sin \theta_2 = 1.5$$

where,
$\theta_1$ is the incident angle; and $\theta_2$ is the refraction angle.

The incident light from the acrylic resin to the air is refracted in such a manner to satisfy the following relation.

$$\sin \theta_2' / \sin \theta_1' = 1.5$$

where,
$\theta_1'$ is the incident angle; and $\theta_2'$ is the refraction angle.

When the incident angle $\theta_1'$ is over 42°, the total reflection will occur in the acrylic resin.

FIG. 6 shows another embodiment of the transparent round bar 18. A portion of the surface of the round bar 18, operator's side, is coated with a reflection film 24 made of, for example, aluminum. This reflection film 24 functions to reflect the light beams directed to the reflection film 24 toward the inside of the transparent round bar 18, thereby increasing the light amount conducted to the liquid crystal display device 14.

FIG. 7 shows still another embodiment of an electronic calculator employing a light collector means of the present invention. Another transparent round bar 26 is fixed to the hinge portion of the tiltable, shielding hood structure 16.

Figure 8:
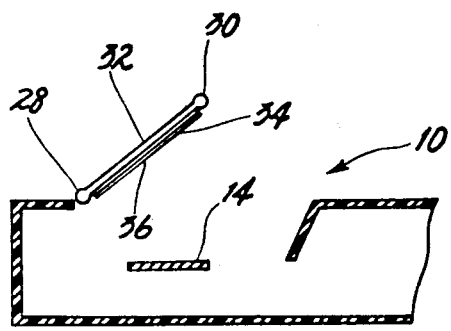
FIG. 8 is a sectional view showing a part of an electronic calculator including yet another embodiment of the light collector means of the present invention.

Referring now to FIG. 8, there is illustrated yet another embodiment of the present invention, two light collecting round bars 28 and 30 are formed at the both ends of a flat plate 32 made of acrylic resin in a single body. The flat plate 32 is fixed to the housing of the electronic calculator 10 above the liquid crystal display device 14, and the internal surface of the flat plate 32 facing the liquid crystal display device 14 is coated with a reflection film 34 made of, for example, aluminum through the use of evaporation technique. A black cloth 36 is adhered to the surface of the reflection film 34. The reflection film 34 functions not only as a conventional hood structure but also to reflect a portion of the light beams introduced into the flat plate 32 toward the light collecting round bars 28 and 30, at which the light beams are refracted or reflected and directed toward the liquid crystal display device 14. The black cloth 36 forms a black background on the reflection electrode of the liquid crystal display device 14, thereby enhancing the display quality.

Reference is made not to FIG. 9, there is illustrated an electronic calculator 10 including a hood structure 38 of the present invention. Like elements corresponding to those of FIG. 1 are indicated by like numerals.

The tiltable, shielding hood structure 38 is rotatably fixed to the housing of the electronic calculator 10 at a hinge portion 40. The shielding hood structure 38 is tiltable from an open position to a closed position above the liquid crystal display device 14. A light collecting round bar 42 made of, for example, acrylic resin is mounted at the end of the tiltable, shielding hood structure 38 through the use of supporters 44 integral with the hood structure 38.

Figure 10:
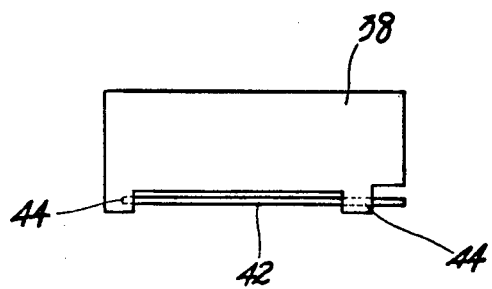
FIG. 10 is a plan view of the hood structure of FIG. 9.
Figure 11:
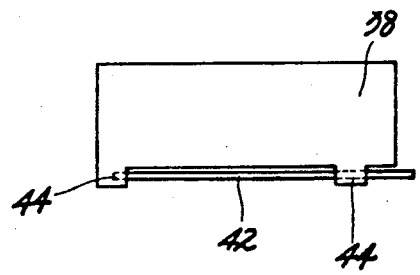
FIG. 11 is a plan view of another embodiment of the hood structure of the present invention.
Figure 12:
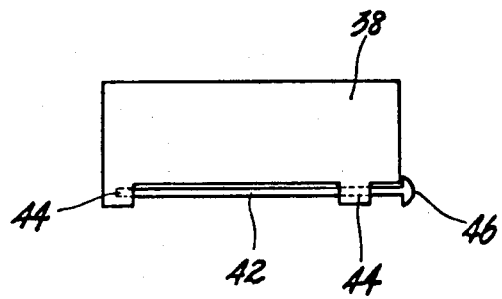
FIG. 12 is a plan view of still another embodiment of the hood structure of the present invention.

FIGS. 10 through 12 show examples of the shielding hood structure 38. In the example of FIG. 10, the light collecting round bar 42 has a length corresponding to the width of the shielding hood structure 38. In the example of FIG. 11, one end of the light collecting round bar 42 is slightly extended from the edge wall of the shielding hood structure 38, thereby facilitating the opening and closing operations of the shielding hood structure 38. In the example of FIG. 12, a knob 46 is formed at the extended end of the light collecting round bar 42 to facilitate the handling of the shielding hood structure 38. The light collecting round bar 42 can be made of transparent or translucent glass or resin.

Figure 13:
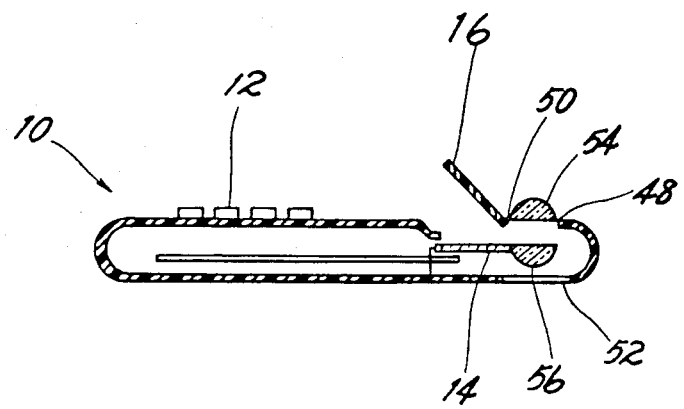
FIG. 13 is a sectional view of an electronic calculator employing a still further embodiment of the light collector means of the present invention.

FIG. 13 shows and electronic calculator employing yet another embodiment of the light collector means of the present invention. Like elements corresponding to those of FIGS. 1 and 9 are indicated by like numerals.

A cut away portion 48 is transversely provided in the upper cabinet of the electronic calculator 10 near a hinge portion 50 of the tiltable, shielding hood structure 16. A window portion 52 is transversely formed in the bottom casing of the electronic calculator 10 to confront the cut away portion 48. A light collecting bar 54 made of, for example, acryl resin and having a semicircular section is installed in the cut away portion 48. Another light collecting bar 56 is installed in the electronic calculator to confront the window portion 52, the light collecting bar 56 being made of, for example, acryl resin and having a semicircular section. The two light collecting bars 54 and 56 function to refract the light beams introduced therein toward the liquid crystal display device 14.

Figure 14:
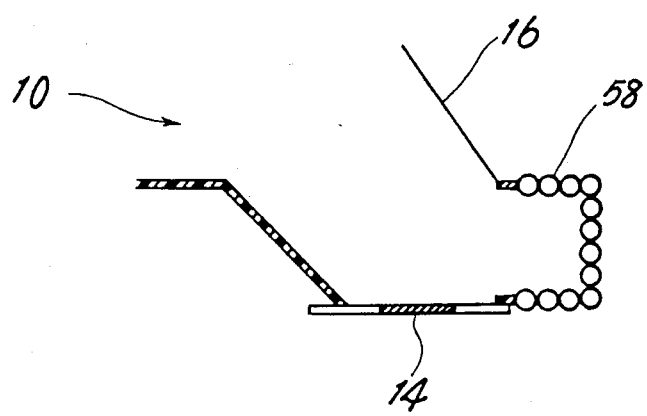
FIG. 14 is a sectional view of an indication device employing an embodiment of the light collector means of the present invention.

FIG. 14 shows a further embodiment of the light collector means of the present invention. A cut away portion is provided at the top of the casing of the electronic calculator 10 near the liquid crystal display device 14 and the shielding hood structure 16. A plurality of transparent round bars 58 are provided at the cut away portion to irradiate the liquid crystal display device 14 through the use of ambient light beams.

Figure 15:
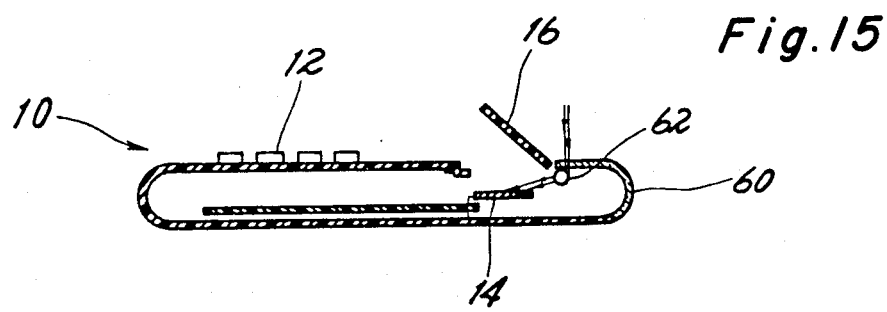
FIG. 15 is a sectional view of an electronic calculator employing another embodiment of the light collector means of the present invention.

Referring now to FIG. 15, there is illustrated another embodiment of the electronic calculator embodying the present invention, a transparent window 60 is formed at the top of the casing of the electronic calculator 10 and a transparent round bar 62 is transversely disposed within the casing of the electronic calculator 10 near the transparent window 60. The transparent round bar 62 functions to irradiate the liquid crystal display device 14 through the use of light beams introduced through the transparent window 60.

Figure 16:
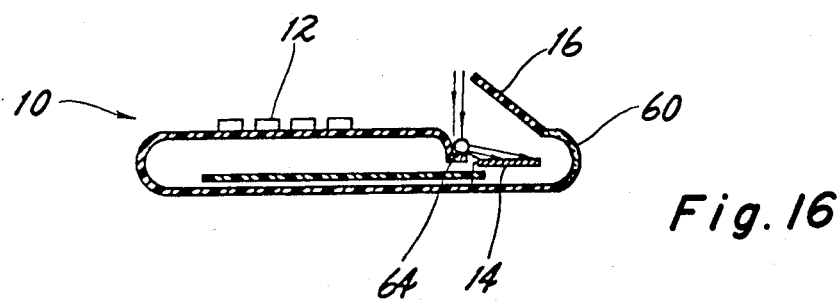
FIG. 16 is a sectional view of an electronic calculator including still another embodiment of the light collector means of the present invention.

Reference is made not to FIG. 16, there is illustrated still another embodiment of the electronic calculator embodying the present invention, wherein like elements corresponding to those of FIG. 15 are indicated by like numerals. A transparent round bar 64 is transversely mounted on the casing of the electronic calculator 10 between the keyboard unit 12 and the liquid crystal display device 14. The transparent round bar 64 is covered with the tiltable, shielding hood structure 16 when the hood structure 16 is in its closed condition.

Although in the foregoing embodiments the light collecting means is the transparent round bar, the light collecting means can be of any shape suited for collecting, refracting or focusing the light beams.

Moreover, the light collecting means of the present invention can be applied to an electronic wristwatch or clock including a liquid crystal display device.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a housing for an electronic calculator including a calculator body having an upper surface provided with a keyboard section and an indication section of the liquid crystal type, and a shielding hood structure mounted on the end portion of the upper surface of said calculator body adjacent said indication section, said shielding hood having a lowermost end portion adjacent said calculator body and extending to an upper end portion positioned above said indication section, the improvement comprising:

a light collector means mounted at said upper end of said shielding hood structure for refracting light beams introduced therein toward said indication section.

2. The housing for an electronic calculator of claim 1, wherein the light collector means is a transparent round bar transversely mounted at the upper end of the shielding hood structure.

3. The housing for an electronic calculator of claim 2, wherein the transparent round bar is made of acrylic resin.

4. The housing for an electronic calculator of claim 2, wherein the shielding hood structure comprises:

a transparent flat plate; and a reflection film attached to the display adjacent surface of the transparent flat plate.

5. The housing for an electronic calculator of claim 4, wherein the transparent round bar is integral with the transparent flat plate; and which further comprises a black cloth adhered to the display adjacent surface of the reflection film.

6. The housing for an electronic calculator of claim 5, wherein the reflection film is made of aluminum and formed through the use of evaporation technique.

7. The housing for an electronic calculator of claim 5, wherein said transparent round bar and said transparent flat plate are made of acrylic resin.

8. The housing for an electronic calculator of claim 4, wherein the transparent round bar is integral with the transparent flat plate.

9. The housing for an electronic calculator of claim 4, which further comprises a black cloth adhered to the display adjacent surface of the reflection film.

10. The housing for an electronic calculator of claim 4, wherein the reflection film is made of aluminum and formed through the use of evaporation technique.

11. The housing for an electronic calculator of claim 2, wherein the shielding hood structure is tiltable from an open position to a closed position above only said indication section.

12. The housing for an electronic calculator of claim 11, wherein the transparent round bar is extended from the side edge of the tiltable, shielding hood structure, thereby facilitating the opening and closing operation of the tiltable, shielding hood structure.

13. The housing for an electronic calculator of claim 1, wherein the indication section is made of a dynamic scattering mode liquid crystal display device of the reflection type.

14. The housing for an electronic calculator of claim 14, wherein the shielding hood structure is tiltable from an open position to a closed position above only said indication section.

* * * * *